UNITED STATES PATENT OFFICE.

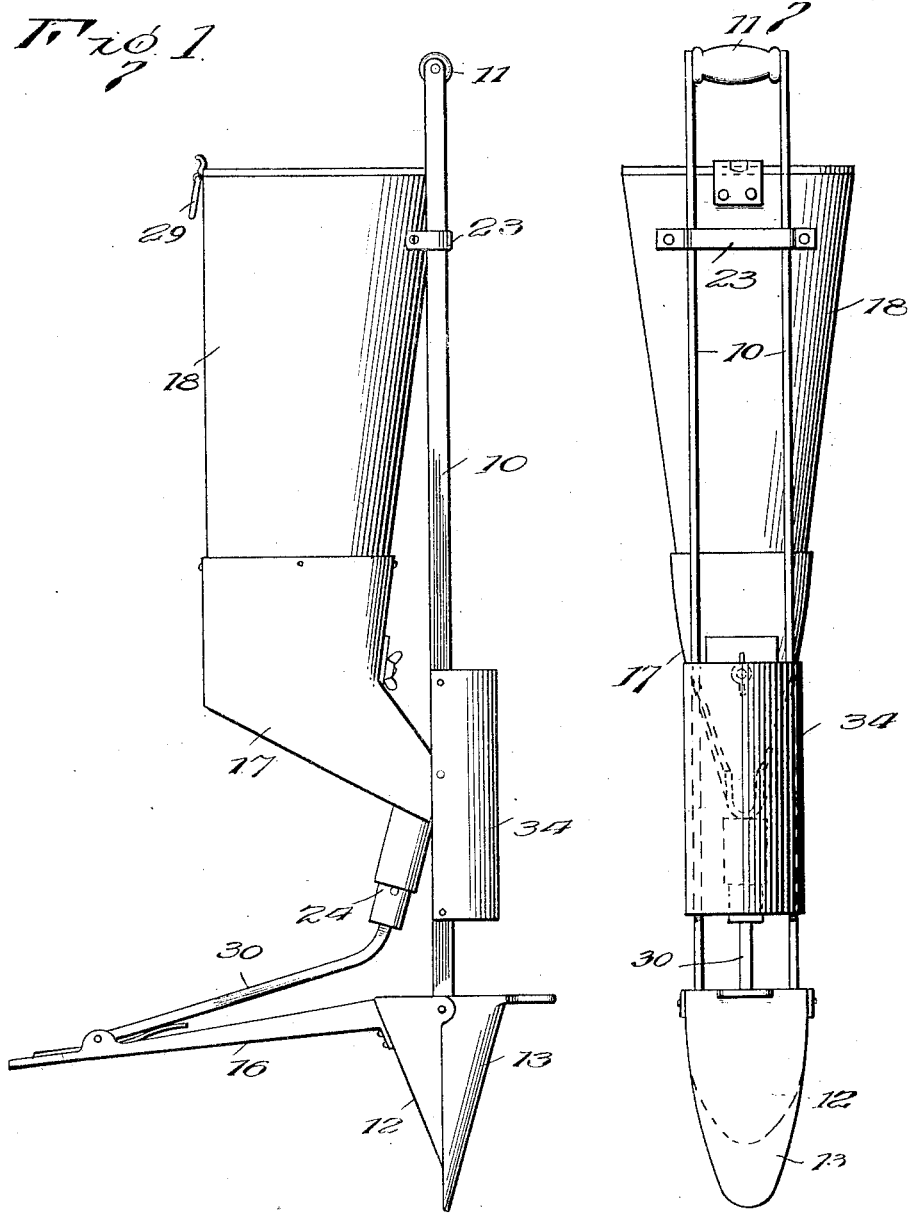

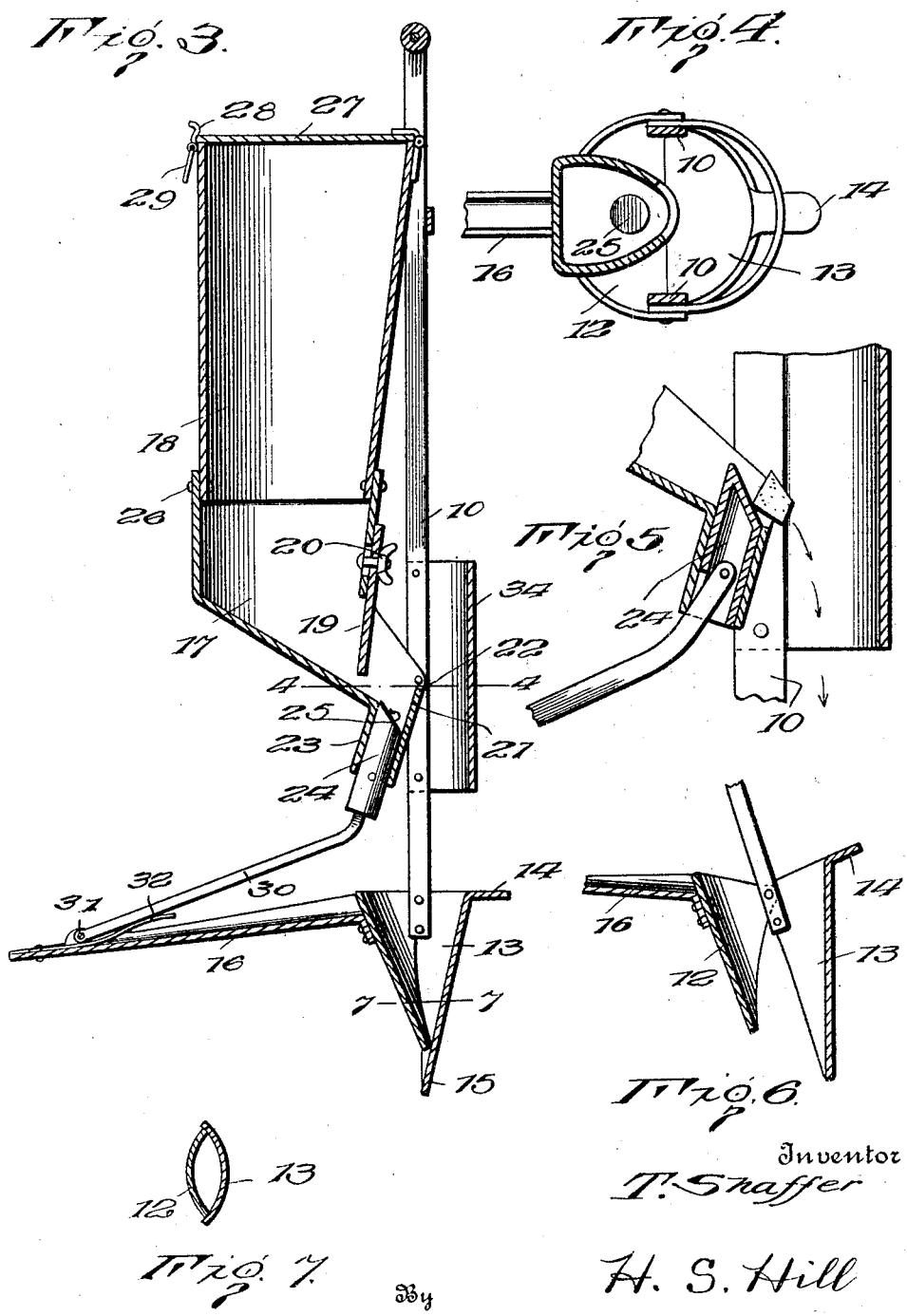

TOBIAS SHAFFER, OF BOONE, IOWA.

HAND POTATO-PLANTER.

1,358,587. Specification of Letters Patent. Patented Nov. 9, 1920.

Application filed September 23, 1919. Serial No. 325,764.

*To all whom it may concern:*

Be it known that I, TOBIAS SHAFFER, a citizen of the United States, residing at Boone, in the county of Boone, State of Iowa, have invented a new and useful Hand Potato-Planter; and I do hereby declare the following to be a full, clear, and exact description of the invention, such as will enable others skilled in the art to which it appertains to make and use the same.

The present invention relates to planters, and more particularly to those of the hand or walking type.

An object of this invention is to provide a planter of this type adapted for planting seed potatoes and the like, and which is provided with a magazine or hopper for carrying upon the planter its supply of potatoes.

Another object of the invention is to provide a planter with improved means for facilitating the entrance of the lower end of the planter in the ground and the positive discharge of the potatoes from the lower end of the planter without the liability of picking up the discharged potato as the planter is withdrawn from the ground.

A further object of the invention is to provide an improved means for feeding the potatoes one at a time only from the hopper or magazine to insure dropping of but one potato at a time in the hole formed by inserting the lower end of the planter.

A still further object of the invention is to provide a planter which is of relatively simple construction and wherein but a single relatively small spring is employed and which is so located and positioned that it will not easily be broken or get out of order, and a planter which may be manipulated from one handle used in inserting the planter in the ground, tilting the planter toward one side to discharge and deposit the single potato, and withdrawing the planter from the ground.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a planter constructed according to the present invention.

Fig. 2 is an outer edge or side elevation of the same, taken at right angles to the showing of Fig. 1.

Fig. 3 is a vertical section taken longitudinally through the planter.

Fig. 4 is a detail enlarged section taken on the line 4—4 of Fig. 3, through the lower end of the planter.

Fig. 5 is a fragmentary enlarged section taken vertically through the lower end of the planter, showing the feeding means.

Fig. 6 is an enlarged section of the jaws at the lower end of the planter, the same being shown in open position.

Fig. 7 is a transverse section taken on the line 7—7 of Fig. 3 through the jaws in closed position.

Referring to the drawings, wherein like members are designated by similar numerals of reference throughout the several views, 10 designates a hand lever which in the present instance is disclosed as comprising a pair of spaced apart bars of metal or the like joined at their upper ends by a handle 11 and connected together at their lower ends by a pair of penetrating jaws 12 and 13. The jaw 13 is riveted or otherwise fixed upon the handle 10 and is provided at its upper end with an out-turned lip 14, constituting a treadle for receiving the foot to aid in penetrating the ground. The jaws 12 and 13 when closed are substantially conical in shape to receive a potato between their upper ends and to form a closure at their lower ends. The jaw 13 is the larger or longer jaw and has a projecting point 15 which is relatively sharp and adapted to facilitate entrance of the lower end of the planter in the ground. The jaw 12, which is the smaller or shorter jaw seats at its lower end against and in the concavity of the jaw 13 to close the lower ends of the jaws and to facilitate the entrance of the jaws in the ground.

The jaw 12 is provided with an arm 16 which may be of sheet metal transversely curved or flanged to reinforce the arm 16, the arm 16 being rigidly secured against the outer side of the jaw 12 and extending outwardly therefrom, or in a direction which will hereinafter be referred to as toward the rear of the planter. The jaw 12 is pivoted upon the lower end of the handle 10 at the upper end of the jaw for admitting the swinging of the lower end of the jaw 12 away from the jaw 13 to open the jaws for depositing a potato in the ground. The arm 16 is adapted to engage at its outer end against the ground when the handle 10 is tilted rearwardly to thus force the jaws open.

The handle 10 carries, at a point above the jaws, a chute 17 having an enlarged upwardly flaring mouth into which may be detachably fitted a hopper 18 adapted to contain a quantitiy of potatoes or the like. An adjustable gate 19 is carried upon the forward side of the chute 17 by a bolt and thumb nut 20, or the like, admitting quick manual adjustment of the gate or member 19 to regulate the flow of potatoes downwardly through the chute 17. The lower end of the chute 17 is provided with a retaining or stop wall 21 adapted to arrest the downward movement of the potatoes through the chute, and the wall 21 has in its upper edge a notch or concavity 22 substantially U-shaped and of a size to receive therethrough a potato when the same is elevated into a position above the wall 21. A tubular guide 23 is carried upon the lower end of the chute 17 and the forward wall of the guide constitutes substantially a continuation of the stop or wall 21 and is adapted to retain and guide a vertically movable plunger 24, the upper end of which has a forwardly inclined or beveled face 25 to receive thereon the lowermost body, and to elevate the same into a position within the opening 22 in the top of the wall 21.

The hopper 18 may be of any suitable size and is interchangeably secured upon the top of the chute 17 by detachable bolts 26, or the like, so that hoppers varying in capacity may be employed. A hinged cover 27 is carried on the hopper and may be held in place by a catch 28 or the like which may constitute a part of the hinged handle 29 on the rear side of the hopper for facilitating the removal and carrying of the same.

Pivoted to the lower end of the plunger 24 is a connecting rod 30 which has its lower portion bent rearwardly and pivotally and slidably connected by a pin 31 to the outer end of the arm 16, a spring 32 being preferably employed between the rod 30 and arm 16 to urge the latter downwardly and normally maintain the jaws 12 and 13 closed. When the arm 16 is raised the link or bar 30 moves the plunger 24 upwardly in the guide 23.

A strap 33 or the like may be employed at the upper end of the hopper 18 for holding it detachably to the handle 10. A guide 34 is secured to the handle 10 opposite the lower end of the chute 17 for deflecting discharged potatoes downwardly into the jaws 12 and 13, the guide 34 being preferably substantially U-shaped in cross section and riveted or otherwise suitably secured to the side pieces of the handle 10 and opening toward the chute 17.

In use, the hopper 18 is filled to the desired capacity with seed potatoes or the like which are usually cut into different shapes and sizes. The potatoes fall through the hopper into the chute 17 and downwardly over the lower wall of the chute past the gate 19 and against the stop 21. The operator now grasps the planter by the handle 11 and inserts the point 15 in the ground, exerting sufficient pressure by hand, or if required by the foot, in engagement with the lip 14 to urge the jaws 12 and 13 into the ground to the desired depth, which is usually six inches or less. As soon as the jaws have been inserted in the ground, the handle 11 with the lever 10 is forced rearwardly to bring the arm 16 against the ground to thus pivot the jaw 12 upon the lower end of the lever 10 to open the jaws and at the same time to raise the plunger 24 into the chute 17 for lifting the lowermost potato over the stop 21. The inclined face 25 forces or rolls the lifted potato over the stop 21 and into the guide 34, from which the potato falls into the space between the jaws 12 and 13. The potato passes down through the open jaws into the ground. The handle 11 is now raised to lift the planter out of the ground, and as the latter is elevated the arm 16 is released and the spring 32 forces the jaw 12 closed, the lower end of the jaw escaping the deposited potato as the jaw is shorter than the fixed jaw 13.

The gate or slide 19 may be quickly adjusted to regulate the feed of the potatoes downwardly through the chute, and as the device is provided with a positive selecting and feeding device, the plunger 24 and adjacent parts, it is adapted peculiarly to large bodies such as potatoes.

Having thus described the invention, what I claim as new and desire to secure by Letters Patent, is:—

1. In a hand planter, an upright lever, fixed and pivoted jaws on the lower end of the lever adapted to penetrate the ground, a lateral arm outstanding from the pivoted jaw and adapted to engage the ground when the lever is swung in one direction to open the pivoted jaw, a seed chute carried by the lever above the jaws, a stop at the delivery end of the chute, a plunger associated with the discharge end of the chute for elevating the seeds over the stop, a link connection between the said plunger and the outstanding arm of the pivoted jaw, and a guide member mounted upon the lever opposite the discharge end of the chute for directing the seed between the jaws.

2. In a hand planter, a lever, fixed and pivoted jaws on the lower end of the lever adapted to penetrate the ground, an arm outstanding from the pivoted jaw and adapted to engage the ground when the lever is swung in one direction to open the pivoted jaw, a seed chute arranged above the jaws, a stop at the delivery end of the chute, a substantially upright plunger associated with the discharge end of the chute for elevating the lowermost seed in the chute and causing it to fall over the stop, and a link connection between the said plunger and the outstanding arm of the pivoted jaw.

In testimony whereof I have signed my name to this specification in the presence of two subscribing witnesses.

TOBIAS SHAFFER.

Witnesses:
JOHN P. HECKERT,
WILLIAM J. STIFFLER.